(12) United States Patent
Sudo et al.

(10) Patent No.: US 8,600,198 B2
(45) Date of Patent: Dec. 3, 2013

(54) SEMICONDUCTOR OPTICAL MODULATOR, SEMICONDUCTOR OPTICAL INTEGRATED DEVICE, AND METHOD OF MANUFACTURING THE SAME

(75) Inventors: Shinya Sudo, Tokyo (JP); Tomoaki Kato, Tokyo (JP); Kenji Sato, Tokyo (JP); Takao Morimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 148 days.

(21) Appl. No.: 13/254,336

(22) PCT Filed: Mar. 5, 2010

(86) PCT No.: PCT/JP2010/001552
§ 371 (c)(1),
(2), (4) Date: Sep. 1, 2011

(87) PCT Pub. No.: WO2010/100946
PCT Pub. Date: Sep. 10, 2010

(65) Prior Publication Data
US 2011/0317956 A1    Dec. 29, 2011

(30) Foreign Application Priority Data
Mar. 5, 2009  (JP) ................................. 2009-051909

(51) Int. Cl.
G02F 1/035    (2006.01)
G02F 1/01     (2006.01)
G02B 6/10     (2006.01)
H01L 21/00    (2006.01)
H01L 33/00    (2010.01)

(52) U.S. Cl.
USPC ....... 385/2; 385/1; 385/129; 438/31; 257/103

(58) Field of Classification Search
USPC ................. 385/1–3, 14, 40, 129–132, 141; 438/29–31; 257/103, E33.067, 257/E33.031, E33.033
See application file for complete search history.

(56) References Cited

U.S. PATENT DOCUMENTS 5,799,119 A * 8/1998 Rolland et al. .................. 385/28
6,205,163 B1 * 3/2001 Hamamoto ................ 372/43.01

FOREIGN PATENT DOCUMENTS

JP    7-270731 A    10/1995
JP    9-45999 A     2/1997
(Continued)

OTHER PUBLICATIONS

International Search Report for PCT/JP2010/001552 mailed Apr. 13, 2010.

Primary Examiner — Kaveh Kianni
Assistant Examiner — Hung Lam

(57) ABSTRACT

The invention provides a semiconductor optical modulator including a two-step mesa optical waveguide having a first clad layer (101); a mesa-like core layer (102) formed over the first clad layer (101); and a second clad layer (103) formed into a mesa shape over the core layer (102), and having a mesa width smaller than that of the core layer (102). The two-step mesa optical waveguide includes a multi-mode optical waveguide region to which an electric field is applied or into which an electric current is injected, and a single-mode optical waveguide region to which the electric field is not applied and into which the electric current is not injected. When the mesa width of the core layer in the multi-mode optical waveguide region is defined as $W_{mesa1}$, and the mesa width of the core layer in the single-mode optical waveguide region is defined as $W_{mesa2}$, $W_{mesa1} > W_{mesa2}$ is satisfied.

8 Claims, 17 Drawing Sheets

(56) References Cited

FOREIGN PATENT DOCUMENTS

| | | |
|---|---|---|
| JP | 10-73736 A | 3/1998 |
| JP | 10-73792 A | 3/1998 |
| JP | 2003069153 A | 3/2003 |
| JP | 2006251089 A | 9/2006 |
| JP | 2009021454 A | 1/2009 |

* cited by examiner

FIG. 3
(a)
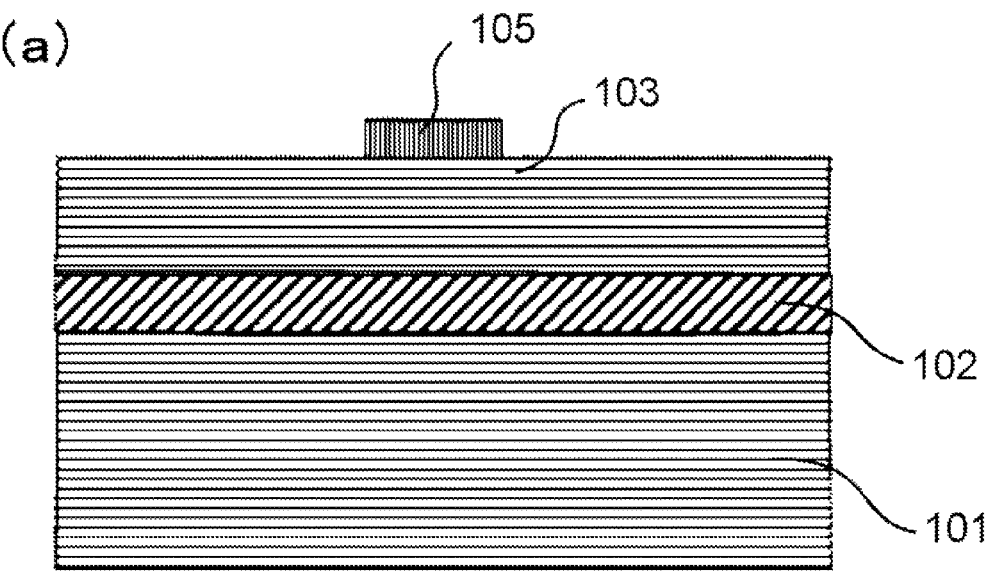
(b)
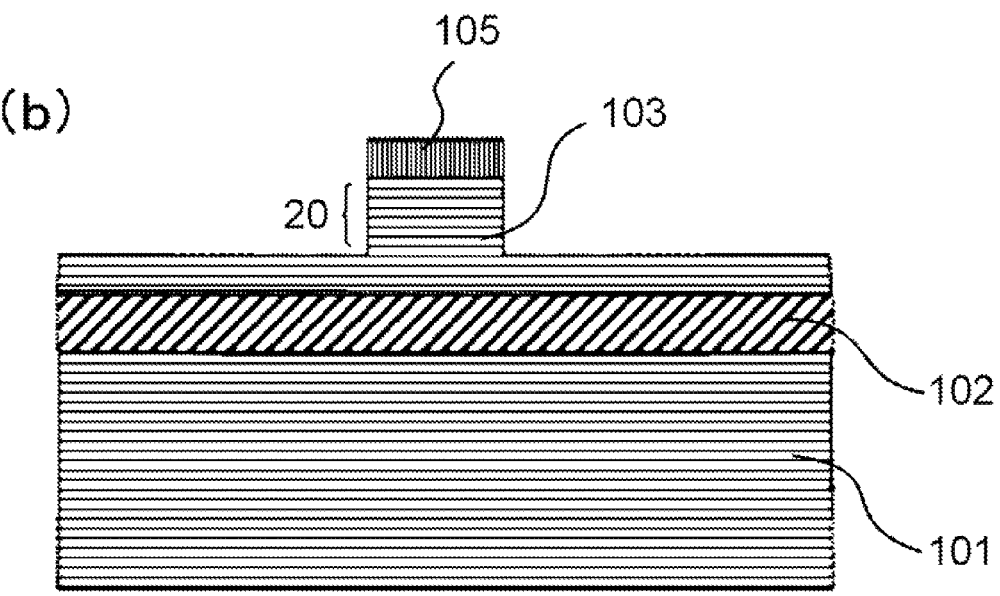

FIG. 4
(a)
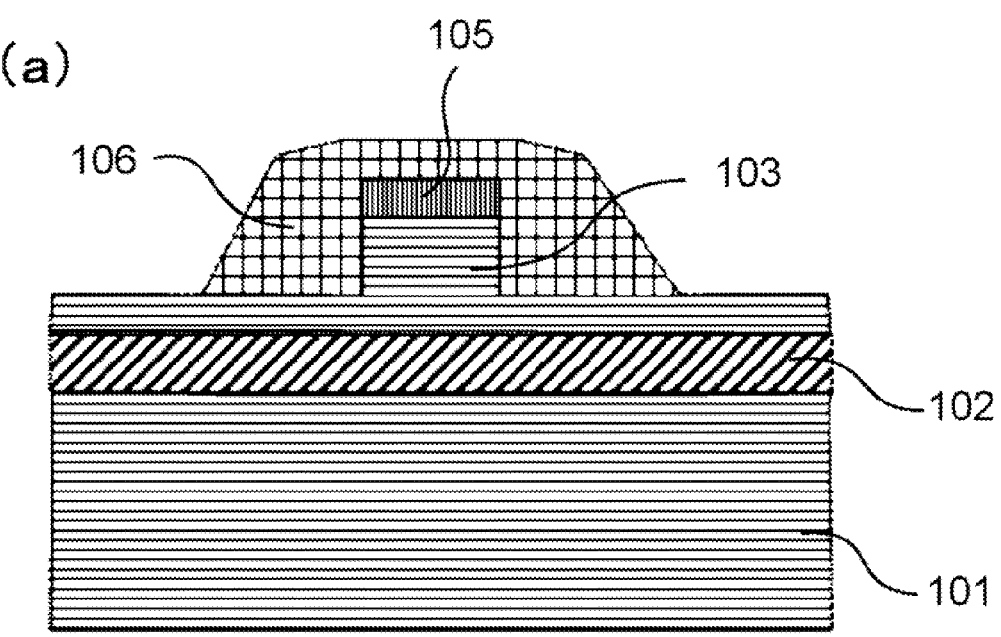
(b)
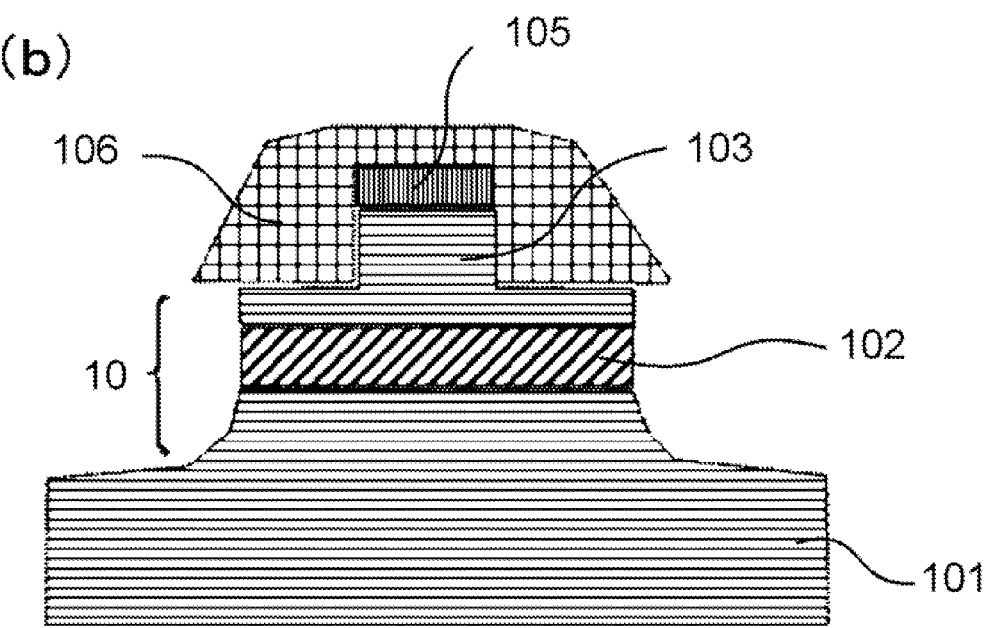

FIG. 13
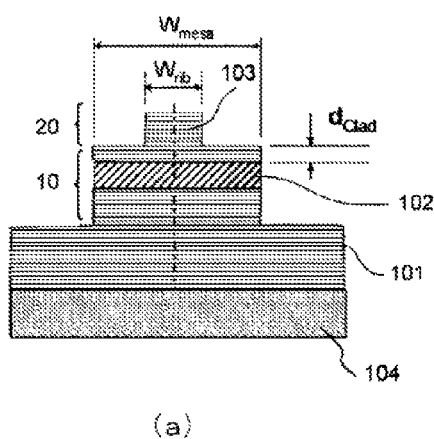
(a)
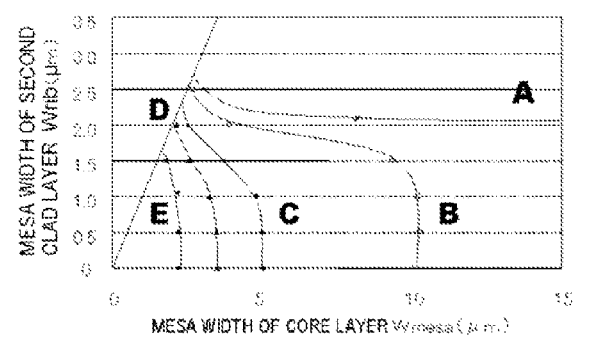
(b)
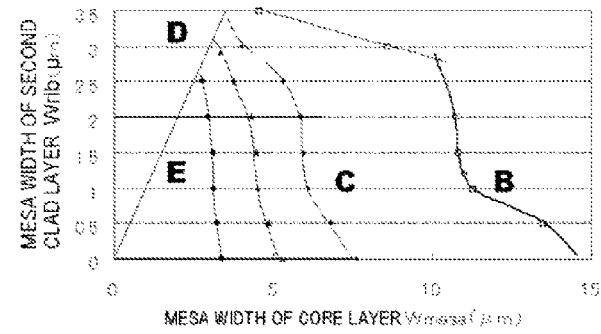
(c)

SEMICONDUCTOR OPTICAL MODULATOR, SEMICONDUCTOR OPTICAL INTEGRATED DEVICE, AND METHOD OF MANUFACTURING THE SAME

TECHNICAL FIELD

The present invention relates to a semiconductor optical modulator, a semiconductor optical integrated device using the same, and a method of manufacturing the same.

BACKGROUND ART

In a wavelength division multiplexing (WDM) in a trunkline, a modulation speed and a transmission capacity have been increased. An optical modulator used in this system has been desired not only that it is driven with a low voltage and it is operated with high modulation speed, but also that it is compact, an optical modulating characteristic does not depend upon a wavelength, and it is compatible with a multilevel coding modulation, which has a high use efficiency of a band.

The optical modulating system that is currently put into practical use is classified, from a viewpoint of modulation principle, into a system directly modulating a light source (laser), an electro absorption optical modulator, and an optical modulator (Mach-Zehnder optical modulator) utilizing a Mach-Zehnder interferometer. Among these, the Mach-Zehnder (MZ) optical modulator can be used for a long-distance transmission such as a trunk-line of an optical modulator, and is excellent that a wavelength dependency of the optical modulating characteristic is small.

An LN optical modulator using lithium niobate (LiNbO$_3$, hereinafter referred to as LN) has typically been used for the MZ optical modulator. However, since the LN is a dielectric material, an advanced fabrication process is needed for the LN optical modulator. Since the length of the device is relatively long, there is a problem in the reduction in size upon assembling in an optical communication system.

On the other hand, a semiconductor MZ optical modulator using a compound semiconductor can be made compact, and further, can be monolithically integrated with a light-emitting device. The semiconductor MZ optical modulator has a device layer structure in which, when an electric field is effectively applied to a core of an optical waveguide, a refractive index is changed so as to change a length of an effective optical path.

The semiconductor MZ optical modulator needs an optical waveguide suitable for a phase modulator. As the features of the optical waveguide suitable for the phase modulator, such examples are given from the viewpoint of the characteristic that the optical waveguide has a great change in the refractive index, a low loss, a single mode characteristic, and low bending loss, and that the optical waveguide is easy to be fabricated (has large tolerance) from the viewpoint of fabrication.

The structure of the waveguide is classified into a rib (ridge) type, a high-mesa type, and a buried type as an optical confinement type. FIGS. 10, 11, and 12 respectively illustrate a sectional view of a waveguide of the rib type, the high-mesa type, and the buried type. Numeral 901 denotes a first clad layer, 902 denotes a core layer, 903 denotes a second clad layer, and 904 denotes a current blocking region. The current blocking region 904 is a region having a function of a clad in the optical waveguide. The rib waveguide is excellent in that a process of fabricating a device can be simplified, since it does not need a regrowth process, and further, since the rib waveguide has a structure in which the core layer 902 is not exposed, the device reliability is not deteriorated even in a semiconductor material (for example, InGaAlAs material or the like on an InP substrate), which is liable to be oxidized. The rib waveguide has a feature of being unsusceptible to a roughness on an etching side face. Therefore, a semiconductor MZ optical modulator using a rib waveguide has been expected.

The rib waveguide is not limited to the structure in FIG. 10, but a structure of the waveguide in which the core layer 902 is partly removed as illustrated in FIG. 11 has been proposed (for example, Patent Document 1). An optical mode control in the rib waveguide in this case is performed with a width W of a rib portion of the second clad layer 903 as in the rib waveguide in FIG. 10. The Patent Document 1 describes that a structure, which can realize a high-speed response because the core layer 902 is partly removed to reduce a parasitic device, can be provided.

The Patent Document 2 describes an optical modulator including a low-temperature growth GaN buffer layer, n-GaN clad layer, non-dope InGaN optical waveguide layer, and p-GaN clad layer, those of which are successively stacked in this order on a (0001) surface sapphire substrate. It also describes that an etching is performed up to the portion above the non-dope InGaN optical waveguide layer by an etching process, whereby a ridge optical waveguide structure is fabricated. It also describes that, since a crystal having a wurtzite-type crystal structure has a strong ion binding property, a large piezoelectric effect, and an increased Pockels effect, a reduction in a voltage, a reduction in size, and an increased modulation speed can simultaneously be realized.

The Patent Document 3 describes an optical modulator in which a structure of the optical waveguide formed into a rib type is formed to satisfy a single waveguide mode condition, and a conductive second clad layer is removed in a region apart from the ridge shape to a degree of not affecting the waveguide mode condition. It describes that this structure can reduce a coupling loss, improve a DC reverse bias characteristic, and perform a high-speed modulation.

The Patent Document 4 describes a ridge optical waveguide structure including a portion that induces light with high intensity, a portion that is bonded by an intermediate portion for inducing light with low density, and the intermediate portion where a mode confinement is gradually changed between the portion inducing light with low intensity and the portion inducing light with high intensity. It also describes that, as the width of the intermediate portion decreases due to a taper, the confinement of the mode is changed so as to cause a squeezing, whereby a mode mismatch is reduced in the binding of the low-intensity inducing portion and the high-intensity inducing portion.

RELATED DOCUMENTS

Patent Documents

PATENT DOCUMENT 1: Japanese Laid-Open Patent Publication No. 2003-069133
PATENT DOCUMENT 2: Japanese Laid-Open Patent Publication No. 2006-251039
PATENT DOCUMENT 3: Japanese Laid-Open Patent Publication No. 07-270731
PATENT DOCUMENT 4: Japanese Laid-Open Patent Publication No. 10-073792

DISCLOSURE OF THE INVENTION

However, when the rib waveguide is applied to the semiconductor MZ optical waveguide, it is found that there is an issue that it is difficult to simultaneously realize the great change in the refractive index, the low optical loss, and the suppression of a high-order mode upon applying an electric field.

In order to satisfy the condition of the great change in the refractive index and the low loss, the number of a well layer increases so as to realize a sufficient change in a refractive index even in a low electric field. In order to reduce an operation voltage, a thickness and number of a well layer in the core layer are set such that the thickness is increased, and the number is increased in general. Specifically, the core layer structure having a strong optical confinement is advantageous for improving the characteristic. It has also been known that an optical absorption gradually increases in general over a predetermined electric field. From this, a strong optical confinement structure is effective for reducing insertion loss.

On the other hand, from the viewpoint of forming a single mode waveguide, the structure having a strong optical confinement is undesirable. In the case of the MZ optical modulator, extinction is attained by setting a π phase difference between both arms. However, if there is a high-order mode, a phase rotation amount to the applied electric field is different for every mode, so that an extinction ratio cannot be increased as the MZ optical modulator. Therefore, it is necessary to utilize an optical waveguide from which the high-order mode is cut off, and hence, it is necessary to avoid a strong optical confinement. Attaining a single mode in the rib waveguide is generally realized by decreasing the rib width (W in FIG. 10), but this is a technique applicable to a waveguide having a weak optical confinement to a degree in which a mode control can be performed only at the rib portion, and this technique sometimes cannot be applied to a waveguide having a strong optical confinement.

From the above, there may be the case in which the condition of setting a single mode cannot be satisfied by the rib width (W) in the semiconductor optical waveguide, used in the MZ modulator, satisfying the great change in the refractive index and the low loss. On the contrary, when the waveguide structure satisfying the condition of setting a single mode is used, the operation voltage increases, and the insertion loss increases, which means the performance as the MZ modulator is deteriorated. Accordingly, the semiconductor MZ optical modulator having a satisfactory characteristic cannot be realized by using the rib waveguide, if this goes on.

It has also been found that, in case where an electric field is applied to a two-step mesa optical waveguide including a core layer, and a second clad layer having a width smaller than that of the core layer, the electric field applied from an electrode mounted on the top of the mesa of the second clad layer is affected by a leak current generated on an facet of the exposed core layer, as the difference between the mesa width of the core layer and the mesa width of the second clad layer becomes smaller. Therefore, the electric field cannot advantageously be applied, resulting in that a problem of further increasing the operation voltage becomes apparent.

The problem described above is not particularly caused in the semiconductor MZ interference optical modulator, but is generally caused on a modulator using a waveguide that modulates the refractive index, specifically, that modulates the phase, by applying the electric field or by supplying an electric current. There is also the same problem in the electro absorption optical modulator that modulates the optical amplitude through the absorption of light.

The present invention is accomplished in view of the above-mentioned circumstance, and an exemplary object of the invention is to provide a semiconductor optical modulator that is excellent in an electric-field applying efficiency and a single mode characteristic.

A semiconductor optical modulator according to an exemplary aspect of the invention includes a two-step mesa optical modulator having a first clad layer;
a mesa-like core layer formed over the first clad layer; and
a second clad layer that is formed over the core layer so as to have a mesa-like shape, and that has a mesa width smaller than a mesa width of the core layer,
wherein the two-step mesa optical waveguide includes:
a multi-mode optical waveguide region to which an electric field is applied or into which an electric current is injected; and
a single-mode optical waveguide to which an electric field is not applied and into which an electric current is not injected,
wherein $W_{mesa1} > W_{mesa2}$ is satisfied, when the mesa width of the core layer in the multi-mode optical waveguide region is defined as $W_{mesa1}$, and the mesa width of the core layer in the single-mode optical waveguide is defined as $W_{mesa2}$.

A semiconductor optical integrated device according to an exemplary aspect of the invention includes the optical modulator described above.

A method of manufacturing a semiconductor optical modulator according to an exemplary aspect of the invention includes forming a two-step mesa optical modulator having a first clad layer;
a mesa-like core layer formed over the first clad layer; and
a second clad layer that is formed over the core layer so as to have a mesa-like shape, and that has a mesa width smaller than a mesa width of the core layer,
wherein the two-step mesa optical waveguide includes:
a multi-mode optical waveguide region to which an electric field is applied or into which an electric current is injected; and
a single-mode optical waveguide to which an electric field is not applied and into which an electric current is not injected,
wherein Wmesa1>Wmesa2 is satisfied, when the mesa width of the core layer in the multi-mode optical waveguide region is defined as $W_{mesa1}$, and the mesa width of the core layer in the single-mode optical waveguide is defined as $W_{mesa2}$.

A method of manufacturing a semiconductor optical integrated device according to an exemplary aspect of the invention includes using the method of manufacturing the optical modulator described above.

The present invention can provide a semiconductor optical modulator that is excellent in an electric-field applying efficiency and a single mode characteristic.

BRIEF DESCRIPTION OF THE DRAWINGS

The above and other objects, advantages and features of the present invention will be more apparent from the following description of certain preferred exemplary embodiments taken in conjunction with the accompanying drawings.

FIG. 3 is a view for describing a method of manufacturing a semiconductor optical modulator according to the exemplary embodiment.

FIG. 4 is a view for describing a method of manufacturing a semiconductor optical modulator according to the exemplary embodiment.

FIG. 13($a$) is a sectional view illustrating a structure of a two-step mesa waveguide used in a simulation. FIGS. 13($b$) and ($c$) are views illustrating an example of a relationship between a mesa width of the two-step mesa waveguide structure and the propagation mode.

EXEMPLARY EMBODIMENTS

An exemplary embodiment of the present invention will be described below with reference to the drawings. In all drawings, same numerals are given to the same components, and the description thereof will not be repeated.

Figure 1:
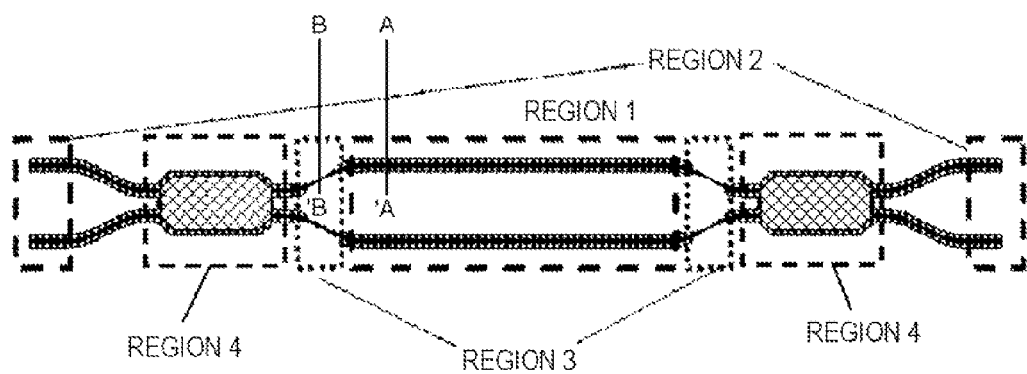
FIG. 1 is a plan view schematically illustrating a semiconductor optical modulator according to an exemplary embodiment.
Figure 2:
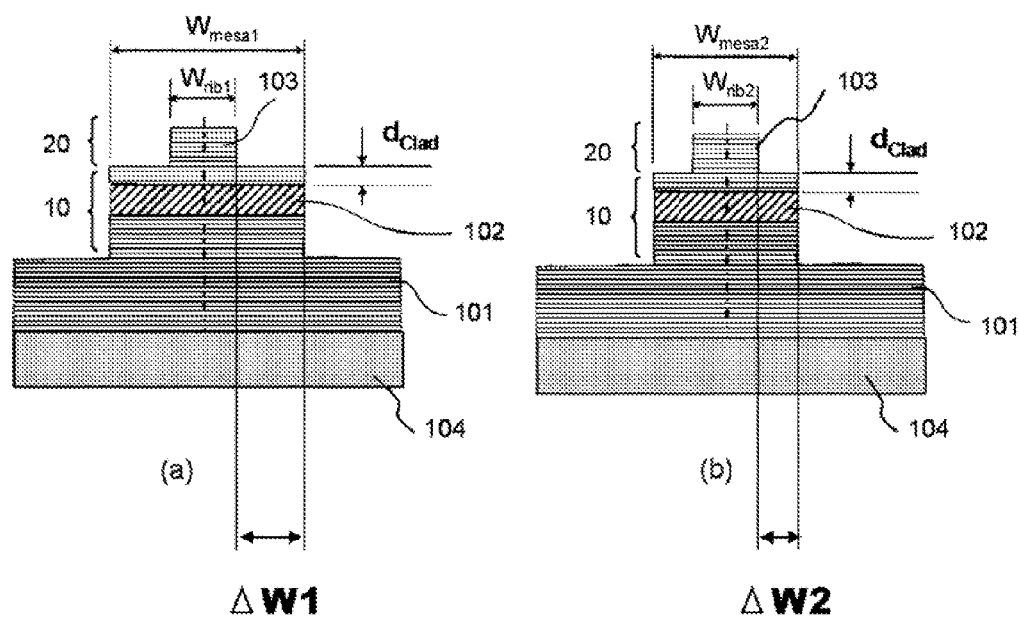
FIG. 2(a) is a sectional view taken along a line A-A' in FIG. 1.
FIG. 2(b) is a sectional view taken along a line B-B' in FIG. 1.

FIG. 1 is a plan view schematically illustrating a semiconductor optical modulator according to the exemplary embodiment. FIG. 2($a$) is a sectional view of a region 1 taken along a line A-A', and FIG. 2($b$) is a sectional view of a region 3 taken along a line B-B'. The optical modulator in the present exemplary embodiment includes a two-step mesa optical waveguide. As illustrated in FIGS. 2($a$) and ($b$), the two-step mesa optical waveguide includes a first clad layer 101 (lower clad layer), a mesa-like core layer 102 formed over the first clad layer 101, and a second clad layer 103 (upper clad layer) that is formed into a mesa-like shape over the core layer 102, and has a mesa width smaller than the mesa width of the core layer 102. The two-step mesa optical waveguide includes a multi-mode optical waveguide region (region 1) to which an electric field is applied or into which an electric current is injected, and a single-mode optical waveguide region (region 3) to which the electric field is not applied, and into which the electric current is not injected. The semiconductor optical modulator has a structure satisfying $W_{mesa1} > W_{mesa2}$, when the mesa width of the core layer 102 in the region 1 is defined as $W_{mesa1}$, and the mesa width of the core layer in the region 3 is defined as $W_{mesa2}$.

The optical modulator in the present exemplary embodiment is a semiconductor MZ interference optical modulator having a structure of a two-step mesa optical modulator monolithically formed on a semiconductor substrate 104 such as n-InP substrate. The semiconductor optical modulator roughly has four different regions. The region 1 is a phase modulator region for rotating a phase through the application of an electric field, the region 2 is a spot size converter (SSC) region that is an input/output unit of light of the modulator, and regions 3 and 4 are passive waveguide regions. Although the sectional views other than the regions 1 and 3 are not illustrated, they are the same as the sectional view in FIG. 2, except that the mesa widths of the core layer 102 and the second clad layer 103 are different. The region 3 is formed at both sides of the region 1. Specifically, it is configured such that light incident from the two-step mesa optical waveguide in one region 3 is propagated in the two-step mesa optical waveguide in the region 1 and becomes light incident on the two-step mesa optical waveguide in the other region 3. The region 2 is provided for enhancing an optical coupling with an outside when light is incident on the optical modulator in the present exemplary embodiment, so that this region can be eliminated according to a purpose of use.

In the present exemplary embodiment, the multi-mode optical waveguide region indicates a waveguide region that can propagate only a fundamental mode and a first-order mode. The single-mode optical waveguide region indicates a waveguide region that can propagate only the fundamental mode.

A first mesa (mesa 10 in the core layer) from the semiconductor substrate 104 is made of a stacked member formed by stacking the first clad layer 101, the core layer 102, and the second clad layer 103 successively. As the thickness $d_{Clad}$ of the second clad layer 103 in the mesa 10 of the core layer is thinner, it becomes difficult for an optical mode to exist. Therefore, when the second clad layer 103 present at the upper part of the mesa 10 of the core layer is partly removed, the optical mode can be guided to the portion where the second clad layer 103 is not removed, specifically, the existence position can be controlled. Specifically, the thickness $d_{Clad}$ of the second clad layer 103 can be set to satisfy $0 \leq d_{clad} \leq 300$ nm.

The core layer 102 has a refractive index larger than that of the first clad layer 101 and the second clad layer 103. Specifically, when a quantum well is used for the core layer 102, the width of the well is set to a size by which a quantum confined Stark effect (QCSE) is observed, for example, to 4 nm to 15 nm. The number of the wells is set to 6 to 20 layers, considering the balance between the modulation efficiency and the intensity of the electric field. In general, the efficiency of the electric-field applying modulator depends upon a product of the width of the well and the number of the well, and it is desirably over about 60 nm. If the well having the width of about 10 nm is used, for example, the number of the wells is desirably 6 or more layers. InGaAsP, InGaAlAs, InGaNAs, and the like can be used for the core layer 102.

The second clad layer 103 is formed on the second mesa (mesa 20 of the second clad layer) from the semiconductor substrate 104. The first clad layer 101 can be made as n-InP, while the second clad layer 103 can be made as p-InP. The mesa width of the mesa 20 of the second clad layer can be 0.5 µm to 3.0 µm, preferably 0.5 µm to 2.0 µm. When the mesa width is 0.5 µm or more, the modulator can stably be manufactured without having variations.

The mesa width $W_{rib1}$ of the second clad layer 103 in the region 1 and the mesa width $W_{rib2}$ of the second clad layer 103 in the region 3 can be set to be substantially equal to each other. In the present exemplary embodiment, "substantially equal" means that the mesa width $W_{rib2}$ in the region 3 falls within a range of ±10% of an average value of the mesa width $W_{rib1}$ of the second clad layer 103 in the region 1.

In the mesa 20 of the second clad layer, a contact layer (not illustrated) may be formed over the second clad layer 103. For example, InGaAs can be used for the contact layer.

A metal electrode (not illustrated) made of Ti or Au is formed over the second clad layer 103 in the region 1 and over the back surface of the semiconductor substrate 104. For example, an electric field of 0 to −10 V can be applied to the region 1.

The two-step mesa optical waveguide according to the present exemplary embodiment may employ a taper structure for the core layer 102 that connects the core layer 102 in the region 1 and the core layer 102 in the region 3. This structure can allow the core layer 102 in the regions, each having a different mesa width, to be connected to each other, while avoiding a propagation loss of light upon a steep connection.

The region 2 is the region to which the electric field is not applied, and into which the electric current is not injected, and also the region that controls the mesa width of the mesa 10 of the core layer and the mesa width of the mesa 20 of the second clad layer so as to shape the form of the optical mode at the facet of the device. Specifically, it performs a control of the first and second mesa widths for the control of the form of the optical mode. Although the wavelength of the light outputted from or inputted to the region 2 is not particularly limited in theory, it is preferably set to be 1.25 μm to 1.65 μm practically for the application of an optical fiber communication.

Figure 11:
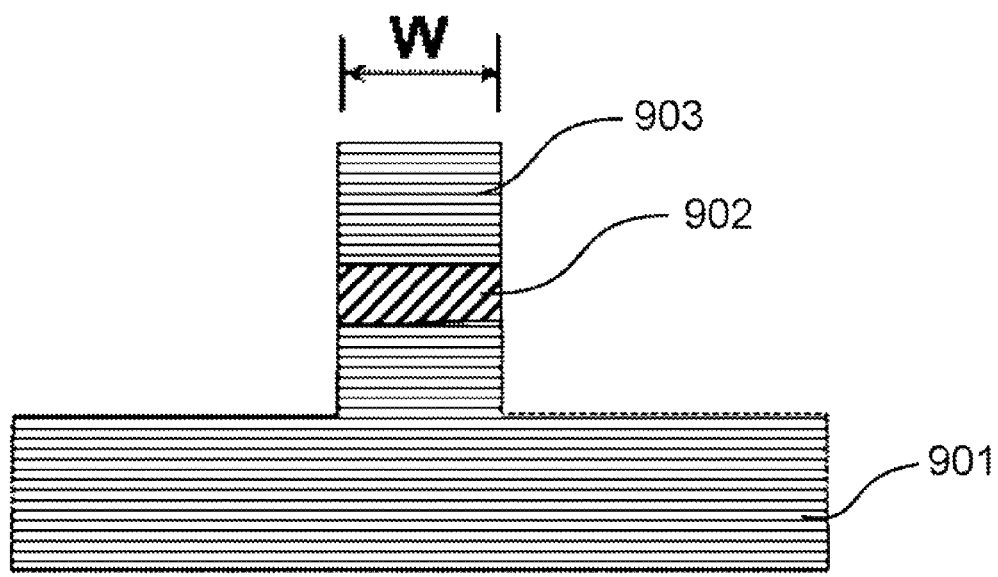
FIG. 11 is a sectional view illustrating one example of a high-mesa semiconductor optical waveguide.
Figure 12:
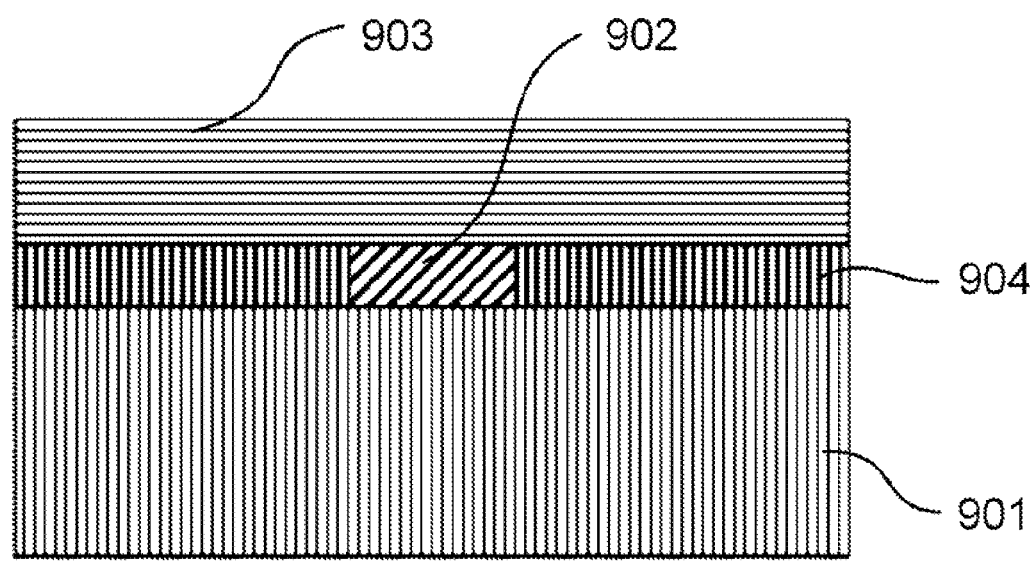
FIG. 12 is a sectional view illustrating one example of a buried semiconductor optical waveguide.

As illustrated in FIG. 1, a curved two-step mesa optical waveguide is provided in the region 3 and between the region 2 and the region 4. The curved two-step mesa optical waveguide is easy to excite the high-order mode, when light is propagated through the curved portion. Therefore, this region is made as the single-mode optical waveguide region that can propagate only the fundamental mode in order to cut off the high-order mode. Since this region is made as the curved two-step mesa optical waveguide, the sidewall of the core portion can be separated away from the center of the optical mode, whereby a low loss can more be attained, and further, since the sidewall of the core portion exists, a radius of the curvature can relatively be reduced, whereby the size of the device can be reduced, compared to the high-mesa structure illustrated in FIG. 11.

The region 4 is the multi-mode interference (MMI) optical waveguide region. This region can be used as a branching filter that divides the light incident on one side into two, and outputs the resultant to an arm at the opposite side, or as a multiplexer that inputs two lights, having a suitable phase difference, to upper and lower arms, and takes the multiplexed light from the arm at the opposite side.

The optical confinement by the structure of the two-step mesa optical waveguide illustrated in FIG. 13(a) can be represented by α in an equation (4) described below.

$$\alpha(nm) = \{(\text{average refractive index obtained by performing a weighted average for thickness of each layer constituting the core layer 102}) - (\text{average value of refractive indexes of second clad layer 101 and first clad layer 103})\} \times (\text{total thickness (nm) of core layer}) \quad (4)$$

It is preferable that the optical waveguide structure according to the present exemplary embodiment is designed so as to satisfy α≥50 nm of the equation (4) described above. The upper limit of α can assume any values, so long as the single-mode optical waveguide region and the multi-mode optical waveguide region are formed.

As an example, FIGS. 13(b) and (c) illustrate a result of evaluating the relationship between the mesa width and the propagation mode by a simulation based upon Film Mode Matching (FMM) in two-step mesa waveguide structures A to E illustrated in FIG. 13(a). FIG. 13(b) is a graph illustrating the relationship of the mesa width by which the first-order mode appears. The waveguide structure that allows the first-order mode can be formed by increasing the mesa width in the axes at the outside of the curve illustrated in FIG. 13(b) as viewed from an origin, specifically, increasing either one of the mesa width of the second clad layer and the mesa width of the core layer. FIG. 13(c) is a graph illustrating the relationship of the mesa width by which a second-order mode appears. The waveguide structure that allows the second-order mode can be formed by increasing the mesa width in the axes at the outside of the curve illustrated in FIG. 13(c) as viewed from an origin, specifically, increasing either one of the mesa width of the second clad layer and the mesa width of the core layer. It is to be noted that $d_{clad}$ is set to be 50 nm. Table 1 illustrates α in the two-step mesa waveguide structures A to E.

TABLE 1

|  | A | B | C | D | E |
|---|---|---|---|---|---|
| α (nm) | 45 | 50 | 57 | 66 | 87 |

When the mesa width of the second clad layer 103 is 2.0 μm or less in the structure A having a weak optical confinement, the first-order mode does not appear as illustrated in FIG. 13(b). Further, the second-order mode does not appear, regardless of the mesa width. Therefore, if the structure A is employed, all regions of the optical modulator can be made as the single-mode optical waveguide region. On the other hand, since the structure A has a weak optical confinement such as α=45, a structure having stronger optical confinement is desirable in order to sufficiently reduce the operation voltage of the modulator.

In the structures B to E having a strong optical confinement such as α of 50 or more, the mesa width of the core layer, specifically, the mesa width $W_{mesa}$ of the mesa 10 of the core layer has to be controlled in order to realize the single-mode optical waveguide region.

Figure 5:
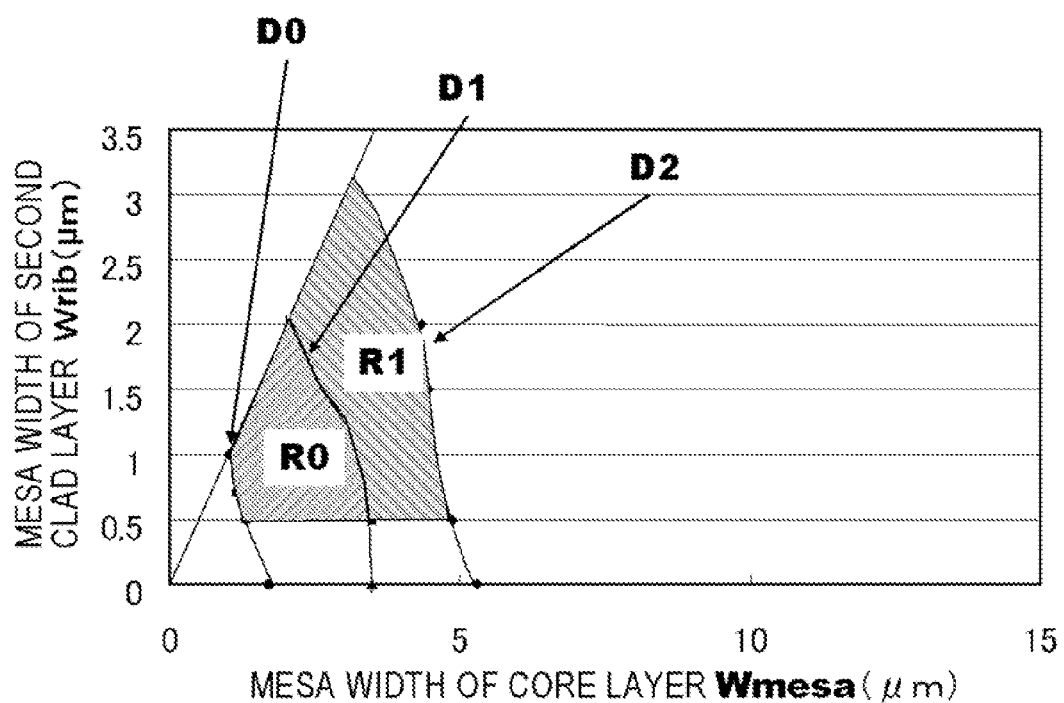
FIG. 5 is a view illustrating a relationship among a mesa width of a core layer, a mesa width of a second clad layer, and a propagation mode.

One example of a method of controlling the mesa width $W_{mesa}$ of the mesa 10 of the core layer will be described below with reference to FIG. 5. FIG. 5 illustrates the relationship between the mesa width of the two-step mesa waveguide structure D and the propagation mode. D0 indicates a boundary where the fundamental mode appears, D1 indicates a boundary where the first-order mode appears, and D2 indicates a boundary where the second-order mode appears. Specifically, R0 is a region where only the fundamental mode appears, while R1 is a region where the fundamental mode and the first-order mode appear, but the second-order mode does not appear. When the two-step mesa waveguide having the single-mode optical waveguide region is fabricated, the mesa width of the core layer 102 and the mesa width of the second clad layer 103 are selected within the range of the region R0 in FIG. 5. When the two-step mesa waveguide having the multi-mode optical waveguide region is fabricated, the mesa width of the core layer 102 and the mesa width of the second clad layer 103 are selected within the range of the region R1 in FIG. 5. When the combination described above is used, the region having the strong optical confinement and the region that allows only a single mode can be formed at any given places.

In the region 1, the difference between the mesa width of the mesa 10 of the core layer and the mesa width of the mesa 20 of the second clad layer is larger than that in the other regions. For example, the mesa widths $W_{rib1}$ and $W_{rib2}$ of the second clad layer 103 are set to be constant, while the mesa width $W_{mesa1}$ of the core layer 102 in the region 1 is set to be larger than the mesa width $W_{mesa2}$ of the core layer 102 in the region 3. With this structure, a leak current from an etching facet in the region 1 can be reduced.

The relationship between the difference ($d_1$) of the mesa width of the mesa 10 of the core layer from the mesa width of the mesa 20 of the second clad layer and the difference ($d_2$) of the mesa width of the mesa 10 of the core layer from the mesa width of the mesa 20 of the second clad layer in the region 3 is preferably set to fall within a fixed range. For example, the optical modulator according to the present exemplary embodiment can employ the structure satisfying the equations (1) to (3). (In the equations, the mesa width of the second clad layer 103 in the region 1 is defined as $W_{rib1}$, while the mesa width of the second clad layer 103 in the region 3 is defined as $W_{rib2}$.)

$$d_1 = (W_{mesa1} - W_{rib1}) \quad (1)$$

$$d_2 = (W_{mesa2} - W_{rib2}) \quad (2)$$

$$1 \text{ μm} \leq d_1 - d_2 \quad (3)$$

The lower limit in the above equation (3) is determined from the allowed electric current in the reverse direction, when a voltage in the reverse direction is applied. Considering the step at one side of the two-step mesa waveguide, the electric field applied to the side face of the mesa 10 of the core layer, which cuts an active layer, decreases, as $\Delta W1 - \Delta W2$ increases in FIG. 2. When the structure that can propagate only the fundamental mode is realized by using the core layer 102 having the strong optical confinement, the width of the core layer 102 decreases in order to attain the single mode characteristic, whereby the intensity of the electric field at the side face of the core layer 102 might increase. Therefore, a problem of a great affect due to the leak current or the like arises. Therefore, when $1 \text{ μm} \leq d_1 - d_2$ is at least established, the leak current can be reduced in the region 1, and the single mode structure can be attained in the region 3. On the other hand, the upper limit in the equation (3) is set so as to satisfy the condition in which the second-order mode does not exist as the optical mode for the optical waveguide in the region 1, and the single mode exists as the optical mode for the optical waveguide in the region 3. In FIG. 2, $\Delta W1$ and $\Delta W2$ can be represented by equations (5) and (6) described below.

$$\Delta W1 = (W_{mesa1} - W_{rib1})/2 \quad (5)$$

$$\Delta W2 = (W_{mesa2} - W_{rib2})/2 \quad (6)$$

Figure 14:
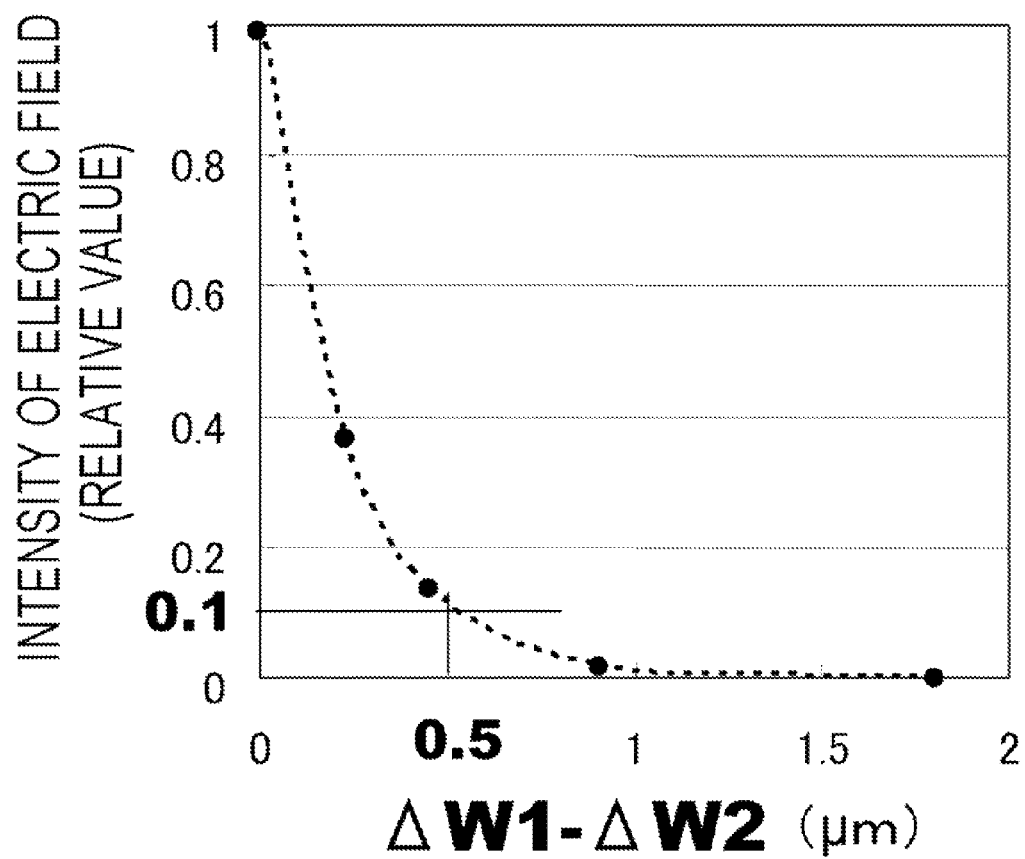
FIG. 14 is a view illustrating a result of the simulation in which a spread of the electric field in the core layer 102 is simulated.

FIG. 14 illustrates a result of the simulation for the spread of the electric field in the core layer 102. As illustrated in the figure, the intensity of the electric field of the modulator can be assumed to be 1/10 from the distribution of the intensity of the electric field when the core layer in the region 1, to which the electric field is applied, is expanded by 0.5 μm. When $d_1 - d_2 = 2(\Delta W1 - \Delta W2) \geq 1$ μm is established, in other words, when $d_1 - d_2$ is set to be 1 μm or more, considering the step at both sides of the two-step mesa waveguide, the intensity of the electric field applied to the facet of the core layer 102 can be reduced to 1/10 or less, compared to the case in which $d_1 - d_2$ is 0, whereby the affect by the leak current caused on the etching facet can be reduced. When $d_1 - d_2 = 2(\Delta W1 - \Delta W2) \geq 2$ μm is established, in other words, $d_1 - d_2$ is set to be 2 μm or more, the intensity of the electric field applied to the facet of the core layer 102 can be reduced to 1/100 or less, compared to the case in which $d_1 - d_2$ is 0. As $\Delta W1$ or $\Delta W2$ is small, the electric field applied from the electrode formed over the mesa of the second clad layer is susceptible to the leak current caused on the facet of the mesa of the exposed core layer due to the damage caused during the fabricating of the mesa structure.

Figure 15:
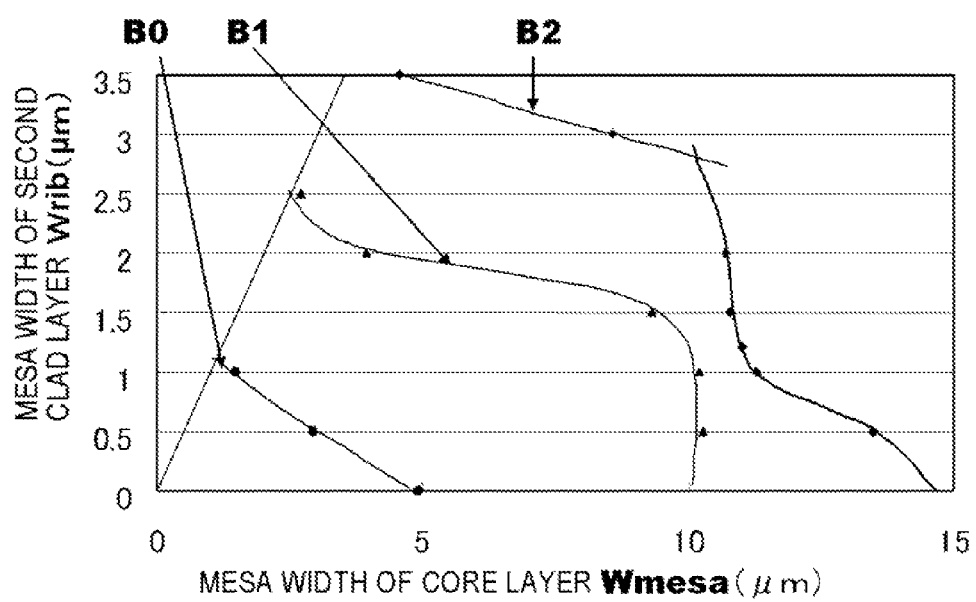
FIG. 15 is a view illustrating an example of a relationship between a mesa width of the two-step mesa waveguide structure and the propagation mode.

FIG. 13(b) illustrates the relationship of the mesa width by which the first-order mode appears, while FIG. 13(c) illustrates the relationship of the mesa width by which the second-order mode appears, wherein the region, which is obtained from these graphs and which allows the first-order mode but does not allow the second-order mode, becomes smaller, as the optical confinement of the core layer 102 is made stronger. Accordingly, the two-step mesa optical waveguide structure B can assume the value in the equation (3) within the widest range among the structures B to E. Therefore, the upper limit of $d_1 - d_2$ in the two-step mesa optical waveguide structure illustrated in FIG. 13(a) can be derived from the view illustrating the relationship between the mesa width of the two-step mesa optical waveguide structure B and the propagation mode. FIG. 15 illustrates the relationship between the mesa width of the two-step mesa optical waveguide structure B and the propagation mode. From the view illustrating the relationship, $d_1 - d_2 < 13$ μm can be derived for the equation (3) for the structure illustrated in FIG. 13(a). B0 indicates a boundary where the fundamental mode appears, B1 indicates a boundary where the first-order mode appears, and B2 indicates a boundary where the second-order mode appears.

Figure 16:
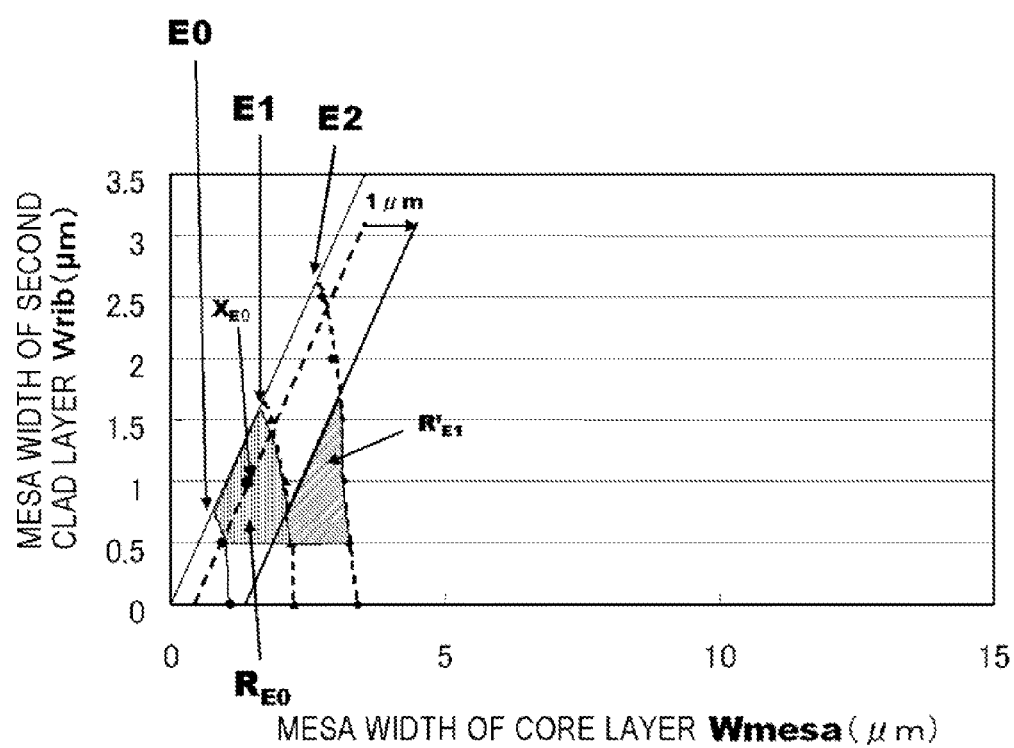
FIG. 16 is a view illustrating an example of a relationship between a mesa width of the two-step mesa waveguide structure and the propagation mode.
Figure 17:
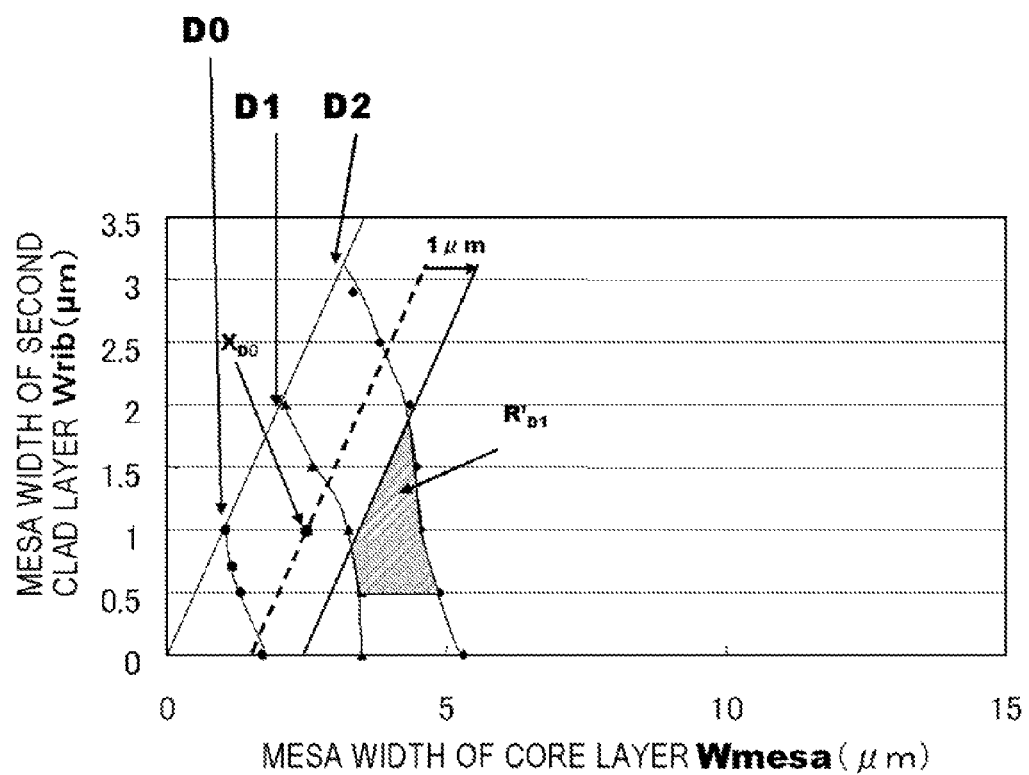
FIG. 17 is a view illustrating an example of a relationship between the mesa width of the two-step mesa waveguide structure and the propagation mode.

FIG. 16 is a view illustrating the relationship between the mesa width of the two-step mesa waveguide structure E and the propagation mode. E0 indicates a boundary where the fundamental mode appears, E1 indicates a boundary where the first-order mode appears, and E2 indicates a boundary where the second-order mode appears. FIG. 17 is a view illustrating the relationship between the mesa width of the two-step mesa waveguide structure D and the propagation mode. D0 indicates a boundary where the fundamental mode appears, D1 indicates a boundary where the first-order mode appears, and D2 indicates a boundary where the second-order mode appears. In FIG. 16, $R_{E0}$ indicates the single-mode region where only the single mode appears. When $X_{E0}$ is employed as the structure of the region 3, for example, the structure of the region 1 is selected from the range indicated by $R'_{E1}$ in order to obtain the modulator whose operation voltage is effectively reduced. In the two-step mesa optical waveguide structure in FIG. 17, when $X_{D0}$ is employed as the structure of the region 3, for example, the structure of the region 1 is selected from the range indicated by $R'_{D1}$ in order to obtain the modulator whose operation voltage is effectively reduced.

When the relationship between the difference ($d_1$) of the mesa width of the mesa 10 of the core layer from the mesa width of the mesa 20 of the second clad layer in the region 1 and the difference ($d_2$) of the mesa width of the mesa 10 of the core layer from the mesa width of the mesa 20 of the second clad layer in the region 3 is set to fall within the above-mentioned range, a satisfactory electric characteristic can be obtained in the region 1, while the effect that the single mode condition is satisfied, and that only the light in the fundamental mode can be introduced in the region 1 can be attained in the region 3.

Next, a manufacturing method of the optical modulator according to the present exemplary embodiment will be described with reference to FIGS. 2 to 4. Firstly, a layer structure is formed by successively stacking the first clad layer 101, the core layer 102, and the second clad layer 103 by a crystal growth. The material and the structure are designed such that the core layer 102 has a refractive index higher than that of the first clad layer 101 and the second clad layer 103. A quantum well or a bulk layer is used for the core layer 102. The optical confinement coefficient of the core layer 102 is desirably set to be great in order to realize the phase modulator having satisfactory efficiency with respect to the application of the electric field.

Then, a mask 105 is formed over the second clad layer 103 (FIG. 3(a)). It is easy that a dielectric film such as $SiO_2$ film or a resist film is used for the mask 105. The thickness of the mask 105 may be designed, considering the difference in the etching rate between the semiconductor and the mask.

Subsequently, a part of the second clad layer 103 is removed in the direction of the optical waveguide, whereby the mesa 20 of the second clad layer is formed (FIG. 3(b)). As one example, the mesa width $W_{rib1}$ in the region 1 and the mesa width $W_{rib2}$ in the region 3 are set to be substantially equal to each other, and the second clad layer 103 is set to have a thickness of 0.5 μm to 2.5 μm in order to correspond to the mesa width. The mesa width of the mesa 20 of the second clad layer in the region 2 is set by utilizing the taper structure within the above-mentioned range, whereby the mesas in the respective regions are formed at a time by the etching. A dry etching process may be used, or a wet etching process may be used.

Next, a mask 106 is formed so as to cover the formed mesa 20 on the second clad layer (FIG. 4(a)). It is easy that a dielectric film such as $SiO_2$ film or a resist film is used for the mask 106. It is feared that a side etching might be performed, simultaneously with the etching in the depth direction. In this case, the width of the mask 106 may only be increased beforehand considering the amount of the side etching.

Then, the core layer 102 is removed in the direction of the optical waveguide to form the mesa 10 of the core layer. The core layer 102 is formed by the etching at a time in order to have the mesa width according to the purpose in the respective regions within the range of 1 μm to 13.5 μm.

Specifically, the core layer 102 in the region 1 is etched in order that the fundamental mode and the first-order mode can be propagated. On the other hand, the core layer 102 in the region 3 is etched in order that only the fundamental mode is propagated. As described above, the mode of the light propagating in the two-step mesa optical waveguide can be determined in the relationship among three factors, which are the mesa width of the core layer 102, the mesa width of the second clad layer 103 in the mesa 20 of the second clad layer, and the optical confinement coefficient of the core layer 102. Accordingly, the light in the target mode can be propagated in the respective regions by appropriately controlling the relationship among the three factors.

Next, an electrode is formed on the second clad layer 103 on which the mesa 20 of the second clad layer is formed. Specifically, the mask 106 is removed after the etching so as to form an $SiN_x$ film, and after the step is eased with the use of polyimide, an insulation is performed with the $SiN_x$ film, whereby the $SiN_x$ film over the second clad layer 103 is etched to form a current injection window. Then, an electrode is deposited over the formed current injection window (for example, Ti/Au), and thereafter, the electrode other than the region 1 is removed by a patterning. Next, the semiconductor substrate 104 is polished to be made into a thin film, and then, an electrode is deposited on the back surface, whereby the semiconductor optical modulator according to the present exemplary embodiment is completed.

Subsequently, the operation and effect of the present exemplary embodiment will be described. In the semiconductor optical modulator according to the present exemplary embodiment, the mesa width $W_{mesa1}$ of the core layer 102 in the multi-mode optical waveguide region 1 to which the electric field is to be applied or into which an electric current is to be injected is set to be larger than the mesa width $W_{mesa2}$ of the core layer 102 in the single-mode optical waveguide region 3. With this structure, the affect by the leak current caused on the etching facet can be reduced more in the multi-mode optical waveguide region 1 to which the electric field is to be applied than in the single-mode optical waveguide region 3, whereby the intensity of the electric field can be increased to effectively suppress the operation voltage. In the region 3 to which the electric field is not applied and into which the electric current is not injected, the high-order mode, which is allowed in the region 1, can be cut off only by decreasing the mesa width $W_{mesa2}$ more than in the multi-mode optical waveguide region 1, whereby this is advantageous in facilitating the manufacture. Accordingly, the semiconductor modulator having excellent electric-field applying efficiency and extinction ratio can easily be produced.

In the conventional rib semiconductor optical waveguide structure, the optical mode is controlled by the mesa width of the second clad layer 103. However, when the optical confinement coefficient of the core layer 102 is intended to be enhanced, a limitation is imposed on the single mode characteristic. On the other hand, in the present exemplary embodiment, the propagation mode is controlled by controlling not only the mesa width of the second clad layer 103 in the mesa 20 of the second clad layer but also the mesa width of the core layer 102. Accordingly, even when the structure having high optical confinement is employed for the core layer 102, the characteristic of the single mode can be imparted to a required portion. Since the mesa width of the core layer 102 is increased at the portion where the electric field is applied or the electric current is injected, the affect given by the exposure of the core layer 102 on the etching facet can be reduced.

The fundamental mode in the two-step mesa waveguide structure is strongly affected by the mesa region of the second clad layer 103 in the mesa 20 of the second clad layer. In view of this, the mesa width of the mesa 20 of the second clad layer is fixed in the direction of the optical waveguide, but the mesa width of the mesa 10 of the core layer is set to be non-constant in the direction of the optical waveguide. With this structure, the mode control and the optical waveguide can relatively independently be controlled.

In the two-step optical waveguide, the optical mode is controlled by the mesa width of the core layer 102. Therefore, a radiation loss can be reduced even in a curved waveguide having a relatively small radius of curvature, as in the high-mesa structure illustrated in FIG. 11.

Figure 6:
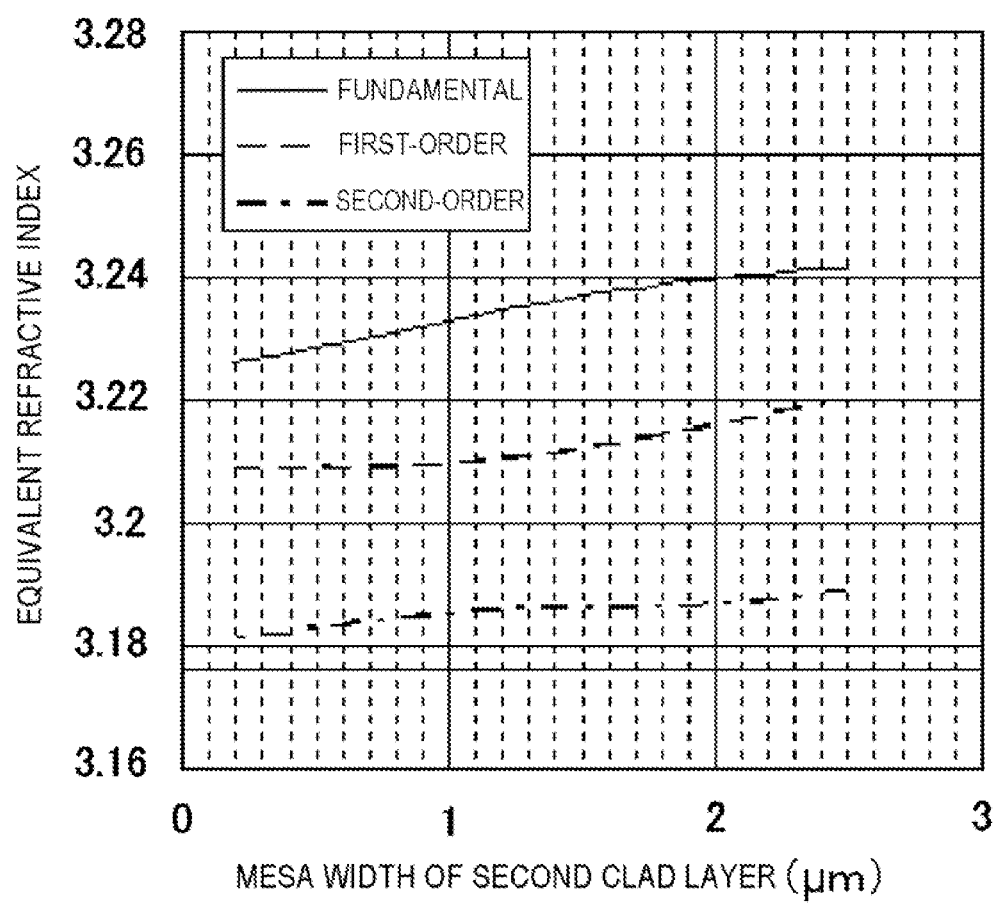
FIG. 6 is a view illustrating a relationship among the mesa width of the second clad layer, an equivalent refractive index, and the propagation mode.
Figure 7:
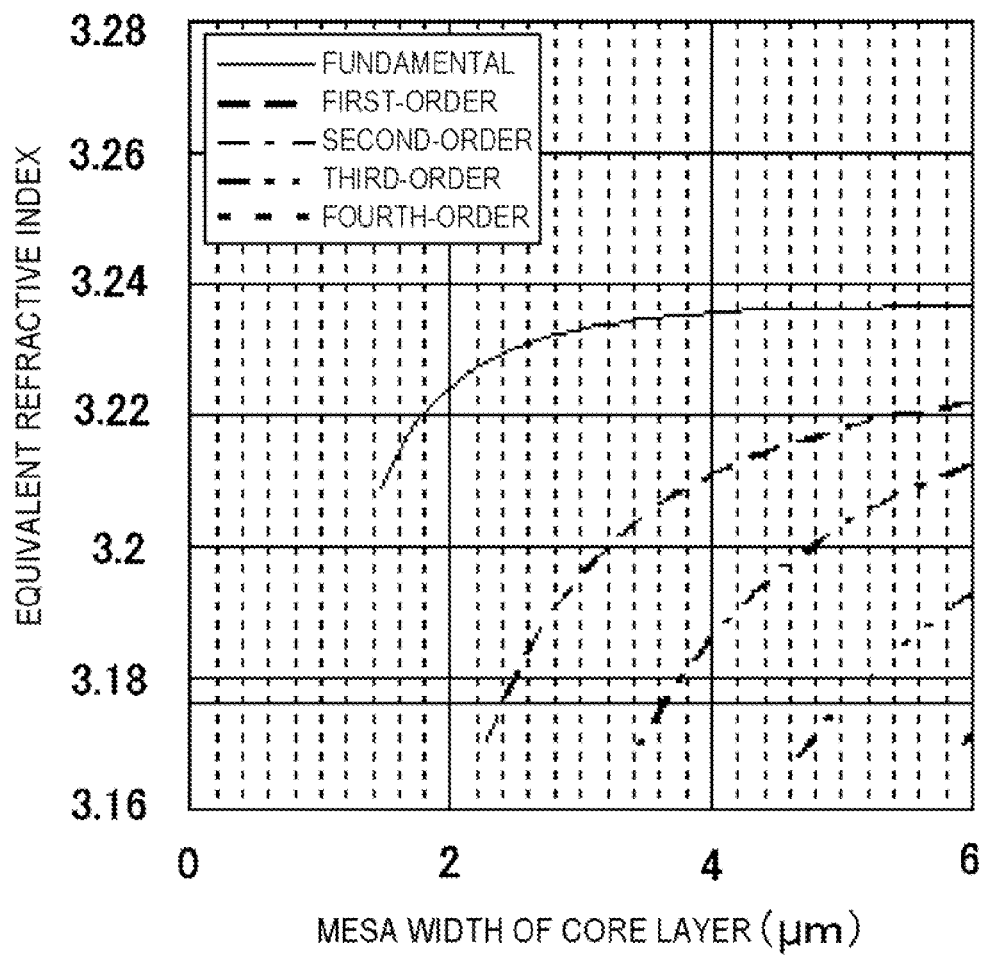
FIG. 7 is a view illustrating a relationship among the mesa width of the core layer, the equivalent refractive index, and the propagation mode.

FIGS. 6 and 7 illustrate an example of a simulation result of an equivalent refractive index in the optical mode that can exist in the two-step mesa optical waveguide. In this waveguide, the single mode cannot be attained only by the control of the mesa width of the mesa 20 of the second clad layer, wherein the high-order mode can exist even if the mesa 20 of the second clad layer is eliminated. The characteristic described above is a typical mode characteristic when the waveguide having a strong optical confinement is formed into a rib structure.

However, it is found that the single mode can be attained by decreasing the mesa width of the core layer 102 as illustrated in FIG. 7. When the single mode is attained by the mesa width of the core layer 102 without changing the mesa width of the second clad layer 103 in the mesa 20 of the second clad layer, the mesa width can be set to be within a relatively wide range, and the single mode can be attained without giving a great influence to the equivalent refractive index in the fundamental mode.

When the two-step optical waveguide is used for the optical modulator, the phase modulation region (region 1) to which the electric field is to be applied is set apart from the etching facet, whereby the deterioration of the device caused by the facet and the recombination of carrier are difficult to occur. In view of this, the mesa width $W_{mesa1}$ of the core layer 102 is increased in the phase modulation region (region 1), so that the etching facet of the core layer 102 is separated from the electrode formed over the second clad layer 103. Therefore, although the reduction in the extinction ratio is feared because the multimode is allowed in the region 1, the high-order mode can be cut off by decreasing the mesa width $W_{mesa2}$ of the core layer 102 in the region 3 at both sides of the region 1.

When the two-step mesa optical waveguide is used as described above, a waveguide structure that can independently control the great change in the refractive index and the low waveguide loss upon the application of the electric field, and the single mode characteristic can be realized.

The exemplary embodiment of the present invention has been described above with reference to the drawings, but it is only illustrative of the present invention, and various configurations other than the above-mentioned configuration can be employed.

For example, in the present exemplary embodiment, InGaAsP, InGaAlAs, InGaNAs or the like on the InP substrate is illustrated as the material for the optical waveguide. However, the material is not limited thereto, since the waveguide according to the present invention is applicable to a general optical waveguide including the core layer and the clad layer.

Although the semiconductor MZ interference optical modulator is illustrated as one example in the present exemplary embodiment, the present invention is not limited thereto. The present invention is applicable to a modulator that modulates the refractive index through the application of the electric field or the injection of the electric current. The present invention is also applicable to an electro absorption optical modulator that modulates the amplitude of the light through the absorption of the light.

The present invention can also be realized in a semiconductor optical integrated device formed by integrating the semiconductor optical modulator according to the present exemplary embodiment with the other components. The semiconductor optical integrated device may include a semiconductor optical amplifier for compensating a loss of the semiconductor optical modulator, and a reflection mirror mounted between the semiconductor optical modulator and the semiconductor optical amplifier, in addition to the semiconductor optical modulator according to the above-mentioned exemplary embodiment. The semiconductor optical modulator according to the present exemplary embodiment may be used for a gain medium of an external oscillating laser. Further, it may be made into a semiconductor optical modulator integrated wavelength tunable transmitter formed by combining the phase adjusting region (region 1) of the semiconductor optical modulator according to the present exemplary embodiment and a wavelength tunable filter. When the semiconductor optical modulator according to the present exemplary embodiment and the other components are monolithically integrated as described above, a semiconductor optical modulating function that can simultaneously realize the great change in the refractive index and the low waveguide loss as well as the single mode characteristic can be integrated. Accordingly, the semiconductor optical integrated device having excellent characteristic can be realized.

It is needless to say that the above-mentioned exemplary embodiment and the modifications thereof can be combined within the range in which the contents thereof are not contradicted. The structure of each component has been specifically described in the above-mentioned exemplary embodiment and the modification, and the structure or the like can be changed within the range satisfying the present invention. Since an optical waveguide that can perform a satisfactory phase modulation can be manufactured according to the present invention, it can be utilized in an optical transmission system using the phase modulation in the form in which the merits such as a small size, low loss, and low voltage driving are utilized.

EXAMPLE 1

A two-step mesa optical waveguide constituting the semiconductor optical modulator according to the present invention was manufactured. The sectional view of the two-step mesa optical waveguide is the same as that in FIG. 2. The manufacturing procedure is the same as that illustrated in FIGS. 3 and 4.

An InGaAlAs/InGaAlAs core layer 102 having 10 well layers with a width of the well of 10 nm was epitaxially grown on an n-InP substrate 109. The InGaAlAs/InGaAlAs core layer 102 has a high optical confinement exceeding 60 nm, which is the reference, wherein the a in the equation (9) is 66, the product of the number of the wells and the width of the well is 100 nm. The first clad layer 101 employed n-InP, while the second clad layer 103 employed p-InP.

FIG. 3($a$) illustrates a sectional view in which the mask 105 was formed. The thickness of the second clad layer 103 was 2 μm including the InGaAs serving as the contact layer. Then, an etching was carried out with a dry etching process and a wet etching process by using an $SiO_2$ film as the mask 105. Specifically, the etching was carried out to the depth of 1.7 μm by the dry etching process, and the remaining second clad layer 103 was removed by 0.1 μm by the wet etching process. Thus, the second clad layer 103 was formed to have a mesa shape having a mesa width of 1.6 μm. FIG. 3($b$) illustrates the sectional view of this point. Since the etching rate was different between the semiconductor and the mask 105 in the dry etching process, the thickness of the $SiO_2$ film was set to 300 nm.

Next, the mask 106 was formed with a resist in order that the core layer 102 was formed to have a mesa shape having the mesa width of 5 μm. FIG. 4($a$) illustrates the sectional view of this point.

Thereafter, the etching was carried out according to the wet etching process. In this case, a non-selective etching was carried out for the composition to the depth of about 0.5 μm. By the wet etching, the etching was made in the depth direction, and simultaneously, the lower part of the resist was also etched (side-etching was performed). Therefore, the width of the mask 106 was increased beforehand. FIG. 4($b$) illustrates the sectional view after the wet etching.

Then, the electrode was formed over the second clad layer 103. Specifically, an $SiN_x$ film was formed after the etching, and after the step was eased with the use of polyimide, an insulation was performed with the $SiN_x$ film. Subsequently, only the $SiN_x$ film over the second clad layer 103 was etched to form a current injection window, and the electrode Ti/Au was deposited thereon. Next, the electrode on the unnecessary region was removed by a patterning, and then, the n-InP substrate 104 was polished to be made into a thin film. Thereafter, the electrode was deposited onto the back surface.

Both facets of the optical waveguide manufactured as described above were set to be cleaved facets, wherein light was introduced by an optical fiber. As a result, Fabry-Perot (FP) ripple was observed. When a voltage was applied to the present waveguide (waveguide length was 600 μm) in an amount of 0 to −5 V, it was observed that the peak position was shifted by about a half of the cycle. If the voltage was approximately 0 to −3 V, it was confirmed that the amplitude was not changed, and the waveguide functioned as the waveguide operating as the phase modulator.

EXAMPLE 2

A semiconductor MZ interference optical modulator, which was one example of the semiconductor optical modulator according to the present invention, was manufactured. The top view of the semiconductor MZ interference optical modulator according to the present exemplary embodiment is the same as that in FIG. 1. The optical modulator in the present exemplary embodiment is also composed of a two-step mesa optical waveguide. The sectional view of the two-step mesa optical waveguide is the same as that in FIG. 2. The manufacturing procedure is the same as that illustrated in FIGS. 3 and 4.

An InGaAlAs/InGaAlAs core layer 102 having 10 well layers with a width of the well of 10 nm was epitaxially grown on an n-InP substrate 104. The InGaAlAs/InGaAlAs core layer 102 has a high optical confinement exceeding 60 nm, which is the reference, wherein the a in the equation (4) is 66, the product of the number of the wells and the width of the well is 100 nm. The first clad layer 101 employed n-InP, while the second clad layer 103 employed a stacked body of p-InP and n-InP.

In order to form the semiconductor optical modulator illustrated in FIG. 1 was manufactured, the second clad layer 103 was firstly formed into a mesa shape. The etching was carried out so as to form a taper structure in which the mesa width ($W_{rib1}$, $W_{rib2}$) of the second clad layer 103 in the phase modulator region, which was the region 1, the region 3, and the other passive waveguide region (the region 4) became 1.3 μm, and the mesa width of the second clad layer 103 in the region 2 (SSC region) became 1.3 μm to 1.0 μm within the SSC region. The etching was carried out with a dry etching process and a wet etching process by using an $SiO_2$ film as the mask 105. The thickness of the $SiO_2$ film was set to be 0.3 μm, considering the difference in the etching rate between the semiconductor and the mask 105 in the dry etching process. Since the thickness of the second clad layer 103 was 2 μm including the InGaAs serving as the contact layer, the etching was carried out to a depth of 1.7 μm by the dry etching process, and then, the remaining second clad layer 103 was completely removed by a selective etching according to the wet etching.

Then, the mesa 10 of the core layer was formed. The etching was performed such that the mesa width of the core layer 102 became 4 μm for the phase modulator region in the region 1, and the passive waveguide region in the region 4, became 3 μm for the passive waveguide region in the region 3 at both sides of the phase modulator region, and became 3 μm for the region 2 (SSC region). Specifically, $d_2 - d_1 = 1$ μm was established for the equation (3). In this case, a non-selective etching was carried out for the composition to the depth of about 0.5 μm by the wet etching process. By the wet etching, the etching was made in the depth direction, and simultaneously, the lower part of the resist was also etched (side-etching was performed). Therefore, the width of the mask 106 was increased beforehand, considering this amount.

Figure 8:
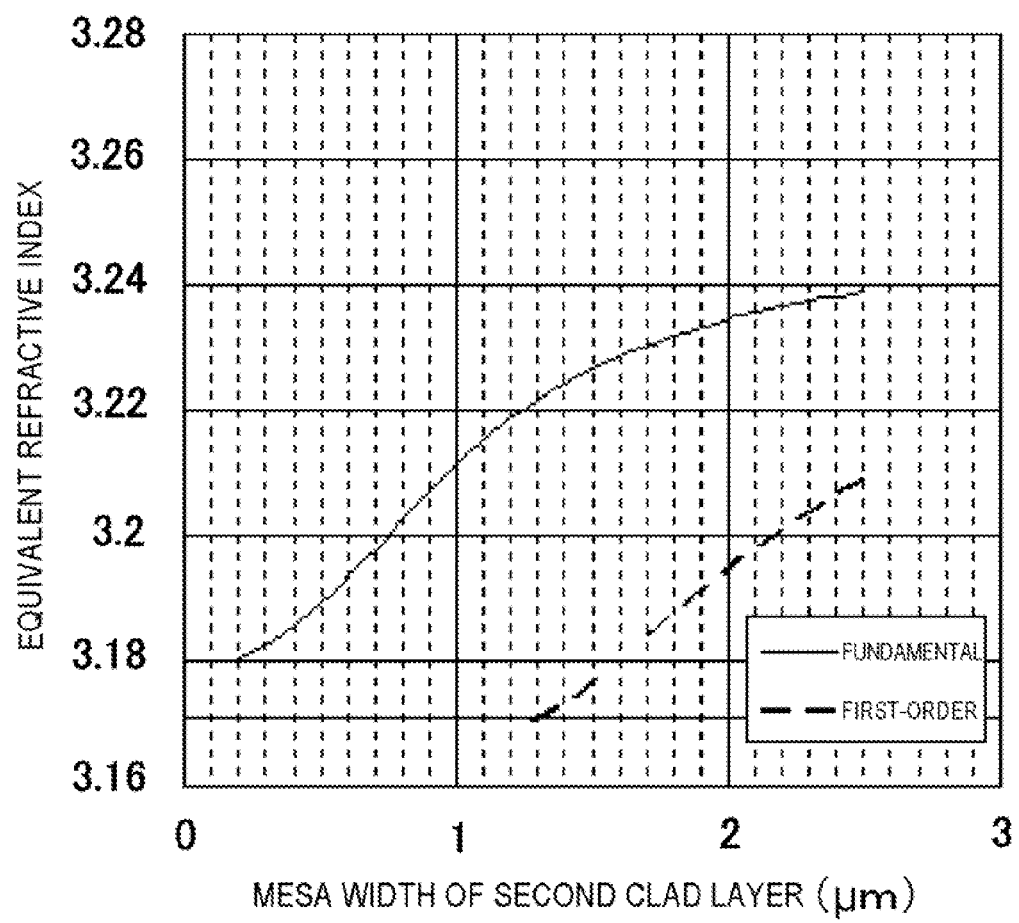
FIG. 8 is a view illustrating a relationship among the mesa width of the second clad layer, the equivalent refractive index, and the propagation mode.
Figure 9:
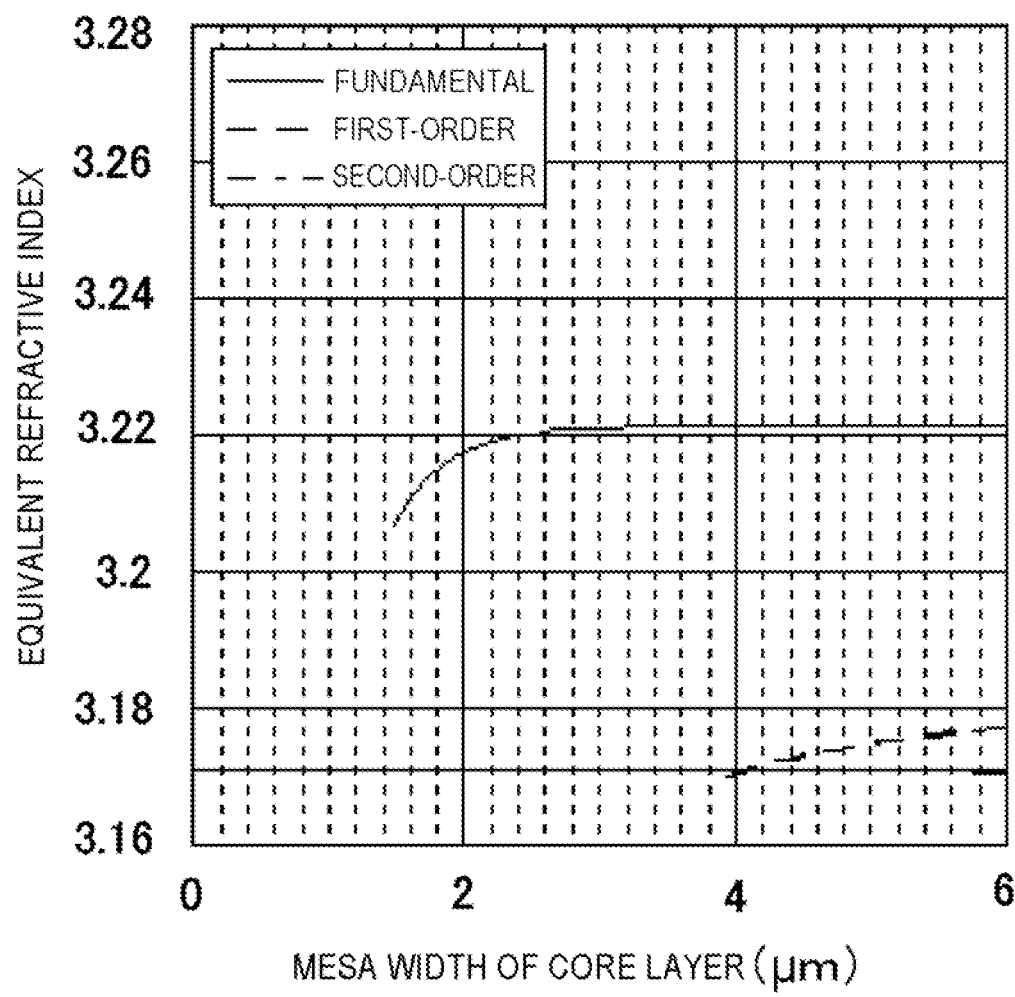
FIG. 9 is a view illustrating a relationship between the mesa width of the core layer, the equivalent refractive index, and the propagation mode.
Figure 10:
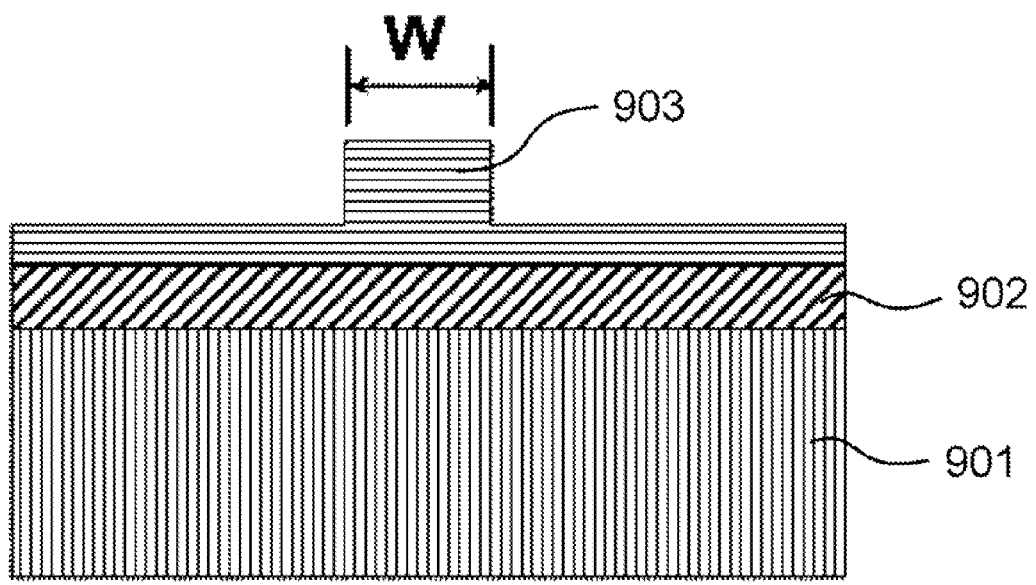
FIG. 10 is a sectional view illustrating one example of a rib semiconductor optical waveguide.

As for the obtained two-step mesa optical waveguide, the dependency of the equivalent refractive index in the optical mode to the mesa width of the second clad layer 103 and the mesa width of the core layer 102 was calculated. As a result, when the mesa width of the second clad layer 103 was fixed to 1.3 μm, the multi-mode waveguide that allows the fundamental mode and the first-order mode was formed, in case where the mesa width of the core layer 102 was 4 μm. On the other hand, when the mesa width of the core layer 102 was 3 μm, the single-mode waveguide that allows only the fundamental mode was formed. In the waveguide in the present example, $d_{clad}$ in FIG. 2 was set to be 0. Therefore, when the mesa width of the upper clad layer 103 was changed, the equivalent refractive index in the optical mode was changed (FIG. 8). On the other hand, when the mode was controlled with the mesa width of the core layer 102 being changed without changing the mesa width of the second clad layer 103, the satisfactory result was obtained in which the equivalent refractive index in the fundamental mode was hardly changed (FIG. 9).

As for the SSC region (region 2), the mesa width of both regions was designed for enhancing optical coupling with a fiber.

Then, the electrode was formed over the second clad layer 103. Specifically, an $SiN_x$ film was formed after the etching, and after the step was eased with the use of polyimide, an insulation was performed with the $SiN_x$ film. Subsequently, only the $SiN_x$ film over the clad layer was etched to form a current injection window, and the electrode Ti/Au was deposited thereon. Next, the electrode on the region other than the region 1 was removed by a patterning, the substrate 104 was polished to be made into a thin film, and then, an electrode was deposited on the back surface.

A cleaved facet was formed on both facets of the manufactured optical modulator, and then, an AR coating (antireflection coating) was performed to measure an optical modulating characteristic. Light was introduced with an optical fiber to a sample having a length of the phase modulating region of 1.5 mm. As a result, the light can be quenched by about 20 dB, when the voltage was applied to about −3 V. It was confirmed that the excessive loss of the waveguide by the application of the electric field was approximately 0 by the application of about −2 V, which meant that the waveguide was operated as a satisfactory optical modulator.

The other exemplary embodiments of the present invention will be described below.

(1) A semiconductor optical waveguide including a first clad region, a core region formed over the clad, and having a refractive index higher than that of the clad, and a second clad region formed over the core region, the second clad region has a mesa shape having a width of $W_{rib}$ in which a part thereof is removed so as to form a mesa shape in the direction of the optical waveguide, and the core region has a mesa width in which a part thereof is removed so as to have a mesa width $W_{mesa}$, which is different from the mesa width $W_{rib}$ of the mesa region of the second clad portion, in the direction of the optical waveguide.

(2) The semiconductor optical waveguide described in (1), wherein the mesa width $W_{mesa}$ of the core region is not fixed in the direction of the optical waveguide.

(3) A semiconductor optical modulator including using the semiconductor optical waveguide described in (1) or (2) as a composed optical waveguide.

(4) The semiconductor optical modulator described in (3), wherein the mesa width ($W_{mesa1}$) of the core region in at least one or more waveguides, among the composed waveguides, in a region 1 to which an electric field is applied or into which an electric current is injected, and the mesa width ($W_{mesa2}$) of the waveguide in a region 2 to which the electric field is not applied and into which the electric current is not injected, are different from each other.

(5) The semiconductor optical modulator described in (3) or (4), wherein the waveguide is not a straight line in at least one or more regions where the composing waveguide exists.

(6) A semiconductor optical integrated device including the semiconductor optical modulator described in (3) to (5) as the constituent thereof.

This application claims priority based upon Japanese patent application No. 2009-51909 filed on Mar. 5, 2009, the content of which is incorporated herein by reference.

The invention claimed is:

1. A semiconductor optical modulator comprising:
a two-step mesa optical modulator having a first clad layer;
a mesa-like core layer formed over the first clad layer; and
a second clad layer that is formed over the core layer so as to have a mesa-like shape, and that has a mesa width smaller than a mesa width of the core layer,
wherein the two-step mesa optical modulator further has:
a multi-mode optical waveguide region to which an electric field is applied or into which an electric current is injected; and
a single-mode optical waveguide region to which an electric field is not applied and into which an electric current is not injected,
wherein $W_{mesa1} > W_{mesa2}$ is satisfied, when the mesa width of the core layer in the multi-mode optical waveguide region is defined as $W_{mesa1}$ and the mesa width of the core layer in the single-mode optical waveguide region is defined as $W_{mesa2}$,
wherein the mesa width $W_{rib1}$ of the second clad layer in the multi-mode optical waveguide region and the mesa width $W_{rib2}$ of the second clad layer in the single-mode optical waveguide region are substantially equal to each other.

2. The semiconductor optical modulator according to claim 1, satisfying equations (1) to (3), when the mesa width of the core layer in the multi-mode optical waveguide region is defined as $W_{mesa1}$, the mesa width of the second clad layer in the multi-mode optical waveguide region is defined as $W_{rib1}$, the mesa width of the core layer in the single-mode optical waveguide region is defined as $W_{mesa2}$, and the mesa width of the second clad layer in the single-mode optical waveguide region is defined as $W_{rib2}$:

$$d_1 = (W_{mesa1} - W_{rib1}) \quad (1)$$

$$d_2 = (W_{mesa2} - W_{rib2}) \quad (2)$$

$$1.0\ \mu m \leq d_1 - d_2. \quad (3)$$

3. The semiconductor optical modulator according to claim 1, wherein light that is propagated through the two-step mesa optical waveguide in the multi-mode optical waveguide region is incident on the two-step mesa optical waveguide in the single-mode optical waveguide region.

4. The semiconductor optical modulator according to claim 1, wherein the two-step mesa optical waveguide includes a connection region that connects the core layer in the multi-mode optical waveguide region and the core layer in the single-mode optical waveguide region, wherein the core layer in the connection region has a taper structure.

5. The semiconductor optical modulator according to claim 1, wherein the two-step mesa optical waveguide having a curved shape is provided in the single-mode optical waveguide region.

6. A semiconductor optical integrated device comprising an optical modulator according to claim 1.

7. A method of manufacturing a semiconductor optical modulator, comprising forming a two-step mesa optical modulator having a first clad layer;
a mesa-like core layer formed over the first clad layer; and
a second clad layer that is formed over the core layer so as to have a mesa-like shape, and that has a mesa width smaller than a mesa width of the core layer,
wherein the two-step mesa optical modulator further has:
a multi-mode optical waveguide region to which an electric field is applied or into which an electric current is injected; and
a single-mode optical waveguide region to which an electric field is not applied and into which an electric current is not injected,
wherein $W_{mesa1} > W_{mesa2}$ is satisfied, when the mesa width of the core layer in the multi-mode optical waveguide region is defined as $W_{mesa1}$, and the mesa width of the core layer in the single-mode optical waveguide region is defined as $W_{mesa2}$,
wherein the mesa width $W_{rib1}$ of the second clad layer in the multi-mode optical waveguide region and the mesa width $W_{rib2}$ of the second clad layer in the single-mode optical waveguide region are substantially equal to each other.

8. A method of manufacturing a semiconductor optical integrated device using a method of manufacturing an optical modulator according to claim 7.

* * * * *